US008635346B2

(12) United States Patent
Wu et al.

(10) Patent No.: US 8,635,346 B2
(45) Date of Patent: Jan. 21, 2014

(54) CONTENT DELIVERY FOR CLIENT SERVER PROTOCOLS WITH USER AFFINITIES USING CONNECTION END-POINT PROXIES

(75) Inventors: David Tze-Si Wu, Fremont, CA (US); Steven McCanne, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 12/632,703

(22) Filed: Dec. 7, 2009

(65) Prior Publication Data

US 2010/0088370 A1 Apr. 8, 2010

Related U.S. Application Data

(62) Division of application No. 10/640,459, filed on Aug. 12, 2003, now Pat. No. 7,650,416.

(51) Int. Cl.
G06F 15/16 (2006.01)
(52) U.S. Cl.
USPC .................... 709/228; 709/207; 709/209
(58) Field of Classification Search
USPC .................................................. 709/227–229
See application file for complete search history.

(56) References Cited

U.S. PATENT DOCUMENTS

| 5,754,774 | A  | 5/1998  | Bittinger et al. |
| 6,178,461 | B1 | 1/2001  | Chan et al. |
| 6,397,253 | B1 | 5/2002  | Quinlan et al. |
| 6,415,329 | B1 | 7/2002  | Gelman et al. |
| 6,473,406 | B1 | 10/2002 | Coile et al. |
| 6,487,538 | B1 | 11/2002 | Gupta et al. |
| 6,598,081 | B1 | 7/2003  | Coile et al. |
| 6,704,730 | B2 | 3/2004  | Moulton et al. |
| 6,721,780 | B1 | 4/2004  | Kasriel et al. |
| 6,772,193 | B1 | 8/2004  | Igawa et al. |
| 6,874,017 | B1 | 3/2005  | Inoue et al. |

(Continued)

FOREIGN PATENT DOCUMENTS

| JP | 2002359649 A | 12/2002 |
| JP | 2004254039 A | 9/2004  |

(Continued)

OTHER PUBLICATIONS

Amer, Ahmed et al., "File Access Prediction with Adjustable Accuracy," 2002; *Proceedings of the Performance, Computing, and Communications Conference, 2002. on 21st IEEE International*; pp. 131-140.

(Continued)

*Primary Examiner* — Hieu Hoang
(74) *Attorney, Agent, or Firm* — Park, Vaughan, Fleming & Dowler LLP

(57) ABSTRACT

In a network supporting transactions between clients and servers over a network path having operating characteristics to overcome, data is transported to overcome the operating characteristics using user affinities and dynamic user location information to selectively preload data, or representations, signatures, segments, etc. of data, in order to overcome the one or more operating characteristic. Examples of operating characteristics to overcome include bandwidth limitations, errors and latency. The dynamic location information can be stored in data structures accessible by agents of a data server and the data structures are populated based on user activities with respect to proxies associated with user locations, or the dynamic location information can be obtained implicitly as proxies maintain connections after termination by clients and the use of those maintained connections for preloading of data for the users associated with those clients. The data being preloaded can be protocol-specific data or protocol-independent data.

18 Claims, 12 Drawing Sheets

(56) References Cited

U.S. PATENT DOCUMENTS

| | | |
|---|---|---|
| 6,940,835 B2 | 9/2005 | Reza et al. |
| 6,973,485 B2 | 12/2005 | Ebata et al. |
| 6,981,029 B1 | 12/2005 | Menditto et al. |
| 7,047,485 B1 | 5/2006 | Klein et al. |
| 7,161,947 B1 | 1/2007 | Desai |
| 7,316,028 B2 | 1/2008 | Donatelli et al. |
| 2001/0051927 A1 | 12/2001 | London et al. |
| 2002/0062384 A1 | 5/2002 | Tso |
| 2002/0087547 A1 | 7/2002 | Kausik et al. |
| 2002/0091801 A1 | 7/2002 | Lewin et al. |
| 2002/0138511 A1 | 9/2002 | Psounis et al. |
| 2002/0156911 A1 | 10/2002 | Croman et al. |
| 2002/0157019 A1 | 10/2002 | Kadyk et al. |
| 2002/0194382 A1 | 12/2002 | Kausik et al. |
| 2003/0043844 A1 | 3/2003 | Heller |
| 2003/0055826 A1 | 3/2003 | Graham |
| 2003/0115488 A1 | 6/2003 | Kunito et al. |
| 2003/0163646 A1 | 8/2003 | O'Neil |
| 2005/0044242 A1 | 2/2005 | Stevens et al. |

FOREIGN PATENT DOCUMENTS

| | | |
|---|---|---|
| JP | 2004-348495 A | 12/2004 |
| WO | WO 95/20793 A | 8/1995 |
| WO | WO 00/13110 A | 3/2000 |
| WO | WO 01/80022 A | 10/2001 |
| WO | WO 02/054699 A | 7/2002 |

OTHER PUBLICATIONS

Caceres, Ramon et al., "Web Proxy Caching: The Devil is in the Details," Jun. 1998; *Proceedings of the Workshop on Internet Server Performance*; Madison, Wisconsin, pp. 111-118.

Deshpande, Mukund et al., ": Selective Markov Models for Predicting Web-Page Accessess," 2004; *ACM Transactions on Internet Technology*, vol. 4, Issue 2, pp. 163-184.

Factor, Michael and Sheinwald, Dafna, "Compression in the presence of shared data;" 2001; *Information Sciences*; vol. 135; pp. 29-41.

Fan, Li et al., "Summary Cache: A Scalable Wide-Area Web Cache Sharing Protocol," Jun. 2000; *Proceedings of the IEEE/ACM Transactions on Networking*; vol. 8, No. 3; pp. 281-293.

Feldmeier, D.C. et al., "Protocol Boosters," Apr. 1998; IEEE JSAC; vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*; Technical Report # CS243-93; pp. 8-12.

Griffioen, James et al., "Reducing File System Latency using a Predictive Approach," Jun. 1994; *Proceedings of the USENIX Summer 1994 Technical Conference on USENIX*; Technical Conference; vol. 1.

Housel, B.C. et al. ; I., "Emulator Express: A system for optimizing emulator performance for wireless networks;" 2000; *IBM Systems Journal*; vol. 39; No. 2; pp. 384-402.

Knutsson et al., Transparent Proxy Signalling, *Journal of Communications and Networks*, 2001, vol. 3, No. 2, pp. 164-174, ISSN: 1229-2370, Korean Institute of Communication Sciences (KICS), Seoul, Korea.

Lei, Hui et al., "An Analytical Approach to File Prefetching," Jan. 1997; *Proceedings of the Annual Conference on USENIX Annual Technical Conference*; Anaheim, California, pp. 1-12.

Oly, James et al., "Markov Model Prediction of I/O Requests for Scientific Applications," Jun. 2002; *Proceedings of the 16th International Conference on Supercomputing*; pp. 147-155.

Padmanhabhan et al.. "Using Predictive prefetching to improve world wide web latency", Computer Communication Review, ACM, New York, NY, US. vol. 26, No. 3, Jul. 1, 1996, pp. 22-36.

Rhea, Sean C. et al., "Value-Based Web Caching," May 2003; *Proceedings of the 12th International Conference on World Wide Web*; Budapest, Hungary; pp. 619-628.

Tolia, Niraj, et al., "An Architecture for Internet Data Transfer", *Third Symposium on Networked Systems Design and Implementation (NSDI'06)* San Jose, California; May 2006.

Yang, Qiang et al., "Mining Web Logs for Prediction Models in WWW Caching and Prefetching," Aug. 2001; *Proceedings of the Seventh ACM SIGKDD International Conference on Knowledge Discovery and Data Mining KDD'01*: San Francisco, California, pp. 473-478.

Kahol et al., "A Strategy to Manage cache consitency in a disconnected distributed network," IEEE, Jul. 2001.

European Office Action received on Jul. 19, 2010 in related European Application No. 05736807.8.

J. White, "Supply Chain Responsiveness," Britvic Soft Drinks, Carrow, Norvich, Feb. 23, 1998, XP006506548.

CONTENT DELIVERY FOR CLIENT SERVER PROTOCOLS WITH USER AFFINITIES USING CONNECTION END-POINT PROXIES

CROSS-REFERENCES TO RELATED APPLICATIONS

The present application claims priority from and is a divisional application of U.S. application Ser. No. 10/640,459 filed Aug. 12, 2003 (now U.S. Pat. No. 7,650,416, issued Jan. 19, 2010), the entire contents of which are herein incorporated by reference for all purposes. The present disclosure is related to the following commonly assigned co-pending U.S. patent applications:

U.S. patent application Ser. No. 10/285,315 entitled "Transaction Accelerator for Client-Server Communication Systems" (hereinafter "McCanne I") filed on Oct. 30, 2002 is incorporated by reference herein for all purposes.

U.S. patent application Ser. No. 10/285,330 entitled "Content-Based Segmentation Scheme for Data Compression in Storage and Transmission Including Hierarchical Segment Representation" (hereinafter "McCanne II") filed on Oct. 30, 2002 is incorporated by reference herein for all purposes.

U.S. patent application Ser. No. 10/640,405 entitled "Transparent Client-Server Transaction Accelerator" (hereinafter "McCanne III") filed on Aug. 12, 2003 is incorporated by reference herein for all purposes.

U.S. patent application Ser. No. 10/640,562 entitled "Cooperative Proxy Auto Discovery and Connection Interception" (hereinafter "McCanne IV") filed on Aug. 12, 2003, is incorporated by reference herein for all purposes.

FIELD OF THE INVENTION

The present invention relates to data transport over networks in general and more particularly to improvements in data transport at the transport and application levels between a client and a server.

BACKGROUND

Local Area Network (LAN) communication is characterized by generous bandwidths, low latencies and considerable enterprise control over the network. By contrast, Wide Area Networks (WANs) often have lower bandwidths and higher latencies than LANs and often have a measure of network control that is outside the enterprise for which the WAN is being used. In large distributed enterprises, WANs thus pose a performance bottleneck especially when users in distributed offices attempt to access data or applications that are run from centralized data centers. For example, retrieving electronic email ("e-mail") over the WAN from a mail server in a centralized data center can involve a lengthy data transfer that can interfere with an end user's productivity. In contrast, retrieving e-mail from a local mail server across a LAN provides virtually instantaneous performance to an end-user. Similarly, fetching Web pages from a Web server or files from a file server across a WAN can be difficult in terms of performance compared to fetching such data from a local server across a LAN.

To generalize, users will often need to run applications that are designed with acceptable performance for a particular network configuration, but have to run those applications over a network configuration that has a much lower performance. As a common example is a LAN-based application that must accommodate a WAN, that example is used herein in several places.

Several approaches to overcoming the network performance for the lower performance network that is to handle data for applications designed with higher performance networks in mind. However, most solutions are unsatisfactory in one way or another.

One approach is to replicate servers and deploy systems that automatically mirror or replicate data from origin servers in data centers to replicated servers in distributed locations to, in effect, move copies of the data closer to clients. The replicated servers would then have copies (a mirror) of the data from the origin server, but the replicated servers would be closed to the clients they server than the origin server. Clients would access data from their local replicated server to achieve better performance, since the data would be "closer" in a network sense. This approach suffers from the complexity and expense of deploying duplicate servers and managing the flow and synchronization of data from the origin servers to the replicated servers. With this approach, it is in difficult to predict what data is needed where and when, so the implementation often just duplicates all available data in each location.

Another approach that has been used with Web content and streaming media is to deploy proxy cache devices at distributed locations to enhance the access performance to data that is retrieved at a given location more than once. In such an arrangement with LANs/WANs, caching proxies are situated on LANs near clients. A caching proxy would act as an intermediary between its set of clients and servers that are accessed across a WAN. A caching proxy stores previously transmitted data in the hope that the cached data will be requested sometime in the future. When a client requests data from a Web server, for example, that client's Web connection is intercepted by the proxy cache. If the proxy cache has the requested data, it simply serves the data locally across the LAN. If it does not have the requested data, it retrieves the requested data from the server across the WAN, transmits the data to the requesting client, and stores the retrieved data in its cache, indexed by its uniform resource locator (URL) in hopes that it would be reused for a later request.

In this fashion, data accessed multiple times suffers the performance bottleneck of the WAN only on the first client request, then enjoys the performance benefit of the LAN for all subsequent accesses. However, for data that is only accessed once, there is no performance benefit. Other techniques are used to improve performance for the first client request for data (that is subsequently requested again or is only requested once). For example, network caching systems have been augmented with content delivery capabilities whereby operators can move desired content into the proxy caches before it is requested. In this model, a content publishing system usually interfaces with a content delivery system to allow an operator to publish content to the set of proxy caching servers. Thus, presuming a certain piece of data has been pre-loaded into a proxy cache in this fashion, the first client request for that data will experience high performance. However, such systems are generally complex to create and administer, and often require new business process to be deployed to support this mode of information delivery. Also, relying upon user configuration to place content appropriately is generally expensive, sub-optimal, and prone to error.

Yet another approach to solving the WAN bottleneck is to distribute servers so that servers for a portion of an enterprise are located near clients for that portion of the enterprise. For example, an enterprise with several branch offices might locate an e-mail server, a file server, etc., in each branch office and store a given user's data on the servers in that user's branch office. For instance, when an e-mail message arrives at the enterprise's main mail gateway for a particular user, the mail gateway will identify the e-mail server for the branch office of the particular user and route the e-mail message to the identified server. When the user retrieves their e-mail, it is fetched from the local office's e-mail server and performance is high. Likewise, a user located in a particular office would store and retrieve files from that office's file server, thereby also achieving high performance.

This approach is not always desirable, however, because of the high cost of managing and distributing servers across many locations in a large enterprise. Each such device must be managed, backed up, serviced, and so forth. It is often far less expensive and more desirable to manage as many servers as possible within a centralized data center. Yet, a centralized architecture requires that servers be accessed over the WAN, which as described above, can cause difficult performance problems.

Authentication and security mechanisms might further complicate many of these approaches. Agents that move content, for example, from an origin server to a replicated server must be completely trusted as such an agent has complete access to all data. Entrusting third party devices or software with "super user" access to everyone's data in an enterprise is a deployment barrier in many customer environments.

Therefore, improved techniques for handling data over networks is needed.

BRIEF SUMMARY

In a network supporting transactions between clients and servers, wherein a client is a host that requests a transaction and a server is a host that issues responses responsive to client requests and wherein packets between a client and a server travel over a network path comprising one or more hops and having one or more operating characteristic to overcome, data is transported to overcome the one or more operating characteristic using user affinities and dynamic user location information to selectively preload data, or representations, signatures, segments, etc. of data, in order to overcome the one or more operating characteristic. Examples of operating characteristics to overcome include bandwidth limitations, errors and latency.

In some embodiments, the dynamic location information is stored in data structures accessible by agents of a data server and the data structures are populated based on user activities with respect to proxies associated with user locations. In other embodiments, the dynamic location information is obtained implicitly as proxies maintain connections after termination by clients and the use of those maintained connections for preloading of data for the users associated with those clients. The data being preloaded can be protocol-specific data or protocol-independent data.

Other features and advantages of the invention will be apparent in view of the following detailed description and preferred embodiments.

DETAILED DESCRIPTION

Figure 1:
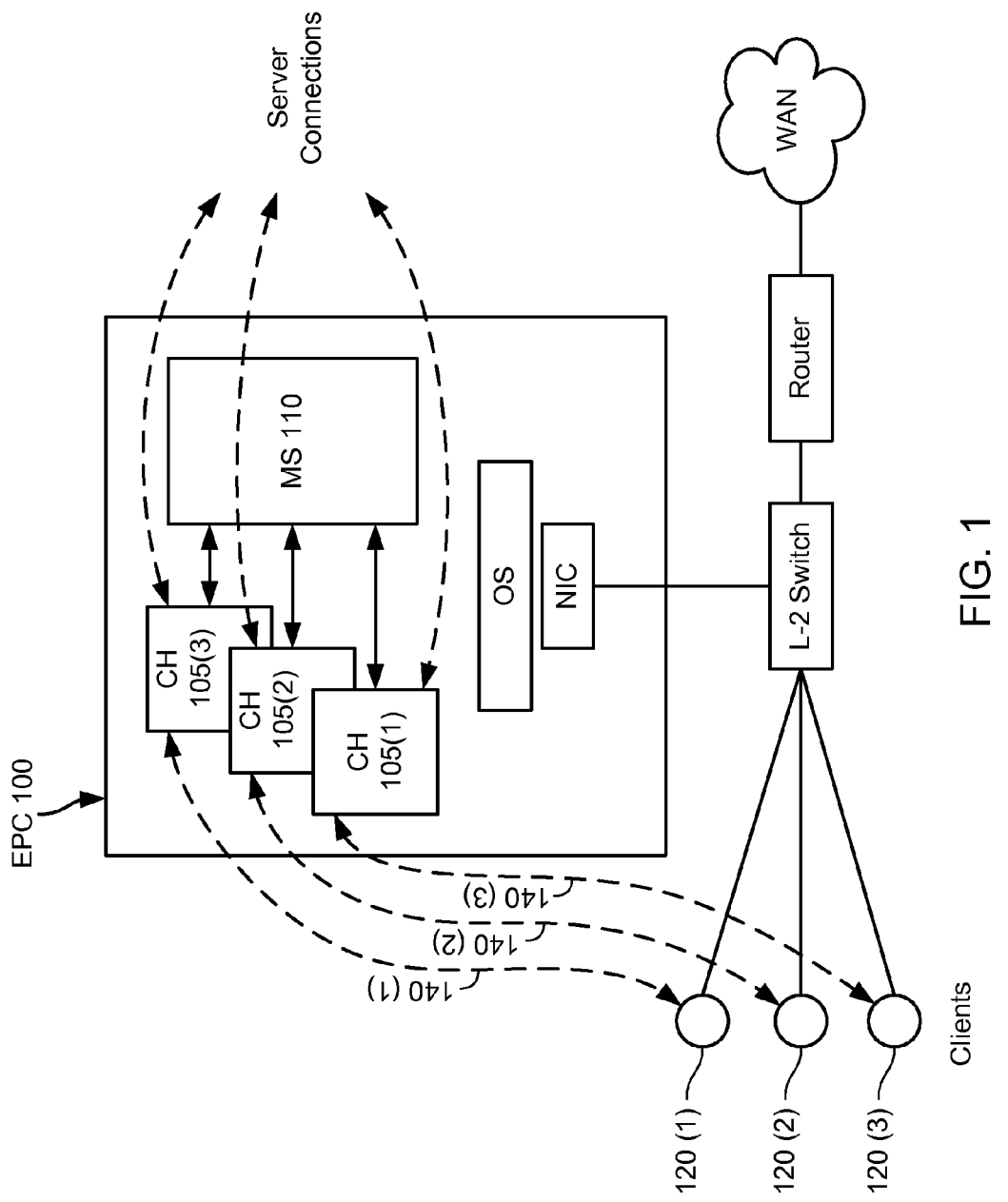
FIG. 1 is a block diagram of one embodiment of a proxy device according to the present invention, in this example being an e-mail proxy device (EPD).

The present invention has many applications, as will be apparent after reading this disclosure. In describing an embodiment of a content delivery system according to the present invention, only a few of the possible variations are described. Other applications and variations will be apparent to one of ordinary skill in the art, so the invention should not be construed as narrowly as the examples, but rather in accordance with the appended claims.

A transaction, as the term is used herein, is a logical set of steps that result in data moving from one place to another. In some cases, the data being moved exists at its origin independent of the transaction, such as a file read transaction where the file exists on the disk of the server. In other cases, the data is generated for the transaction at the origin, such as in response to a request for computation, lookup, etc. Typically, the computer, computer device, etc., initiating the transaction is referred to as the "client" and the computer, computer device, etc., that responds, or is expected to respond, is referred to as the "server".

Data can flow in either direction. For example, a file system client might initiate a transaction by requesting a file read from a file server. The corresponding data will be returned from the server responding to the request, so in that case, the bulk of the data flows from the server to the client. However, where a client initiates a file write transaction, the bulk of the data flows from the client to the server, either as part of the initial request or as subsequent messages.

A transaction can be in multiple parts, but in a simple transaction, a client sends a request (data, a message, a signal, etc., explicitly being the request or indicative of, or representing, the request) to a server and the server responds with a response (data, a message, a signal, etc., explicitly being the response or indicative of, or representing, the response) to the client. More complex transactions, for example, might involve some back and forth, as might be needed for a server to clarify a request, verify the authority of the client to receive a response to the request, get additional information needed for preparing the response, etc.

Herein, the typical example of a connection between a client and a server is a packet network, but other connection means can also be used, such as a point-to-point wired or wireless channel. These elements will be generalized and referred to herein as "nodes" with a channel assumed for communication between the nodes.

A transaction might begin with a client at one node making a request for file data directed to a server at another node, followed by a delivery of a response containing the requested file data. Other transactions might be a request for a specific part of a file, the entire file, all or some of another data construct, or a transaction might relate to data flowing from the requestor or relate to a command. Examples of transactions include "read a block", "read a file", "read a stream", "write a block with this data" (an example of data flowing from the requestor), "open a file", "perform a calculation on this data", "get an e-mail with these characteristics", "send an e-mail", "check for new e-mails", "list directory contents", etc.

Some transactions might involve large amounts of data flowing in one direction or both directions. Some transactions might even involve interactions having more than one requestor and/or more than one receiver. For clarity of description, these many transaction types are described in terms of a typical simple transaction, where one client makes a request of one server and that one server responds to the request in a manner expected by the client. However, upon reading this disclosure, a person of ordinary skill will be able to apply these concepts to one-to-many and many-to-many transactions between client(s) and server(s) or more generally between two nodes. Where data flow is described in one direction, it should be understood that data might flow in the other direction and/or information might flow in only one direction, but data and/or signals flow in both directions to accomplish the movement of information.

As used herein, "near" may refer to physical proximity, but can also refer to network proximity. Network proximity relates to performance attributes. As an example, two nodes of a LAN might be considered more near than two nodes separated by a slow network channel. Often is the case that large physical distances do not result in network proximity, but there are examples where two nodes can be physically close but faraway in network terms and where two nodes can be physically far away but relatively close in network terms.

"User affinity", as the term is used herein, refers to an association with an end user in a computer system or network. Thus, data with a user affinity is intrinsically tied to that user, or in some cases, to one or more users. For example, an e-mail addressed to a user "John Doe" would have a user affinity for that user. Likewise, a file on a file server that is owned by "John Doe" would have a user affinity for that user. More generally, a file that is accessed by multiple users in a distributed setting would have user affinities for each such user.

User affinities can be used advantageously in optimizing data delivery. In a common approach, as described above, multiple servers might be set up in a distributed manner to hold user data, such as e-mails, files, etc., near the users for that data. However, this has the disadvantages that servers are distributed and more difficult to maintain, etc.

This can be overcome by several inventive methods and apparatus. Two examples, and some variations, are described here.

Using Dynamic Location Information Stores to Route Data Having User Affinity

In one approach, data stored on a server is selectively copied to caches nearer to clients, wherein the selectivity is based on user affinity of the copied data and probable locations of users determined from dynamic user location information. One specific example that will be described is an e-mail content delivery system, wherein the user affinity of a given e-mail message might be based on the intended recipients of the e-mail message and dynamic user location information might be determined from previous interactions of user is using clients that are coupled to the e-mail content delivery system.

FIG. 1 illustrates one example of such an e-mail content delivery system. As shown there, an e-mail proxy cache (EPC) 100 is located on a network near the users in a remote location. EPC 100 optimizes performance of communications between the clients used by the users to centralized e-mail servers over a WAN. EPC 100 attaches to the network through one or more network interface card (NIC) and comprises mechanisms for terminating and optionally intercepting client connections, a message store to hold copies of e-mail messages, and connection handlers to terminate and initiate e-mail transport connections between client and server.

EPC 100 is shown including connection handlers 105, a message store 110, clients 120 and client connections 140 between clients 120 and connection handlers 105. Where multiple instances of similar items are present in the figures, they are denoted with a common reference number and distinct instances are represented with a distinct parentheticals. Thus, FIG. 1 shows three connection handlers 105(1), 105(2), 105(3). It should be understood that while these examples show three clients and three connection handlers, fewer or more clients might be present and fewer or more connection handlers might be present (and not necessarily the same number of connection handlers as the number of clients).

Connection handlers 105 (and portions of EPC 100) might be software processes running on a computer system attached to the network through an NIC connected to a layer-2 switch. EPC 100 assigned a network address (e.g., an Internet Protocol, or IP, address). Each connection handler (CH) 105 terminates a client session and initiates one or more server connections on behalf of the corresponding client 120. For example, client 120(1) communicates with CH 105(1) over connection 140(1). Connection handlers 105 store and retrieve copies of e-mail message data in message store 110.

When deployed in this fashion, clients attached to a LAN communicate with EPC 130 rather than the origin server directly, e.g., by using the EPC's IP address instead of the server's address. This can provide some benefits, but further improvements are possible, as the approach is shown in FIG. 1 is often difficult to achieve when e-mail protocols and clients do not readily support such a configuration.

Figure 2:
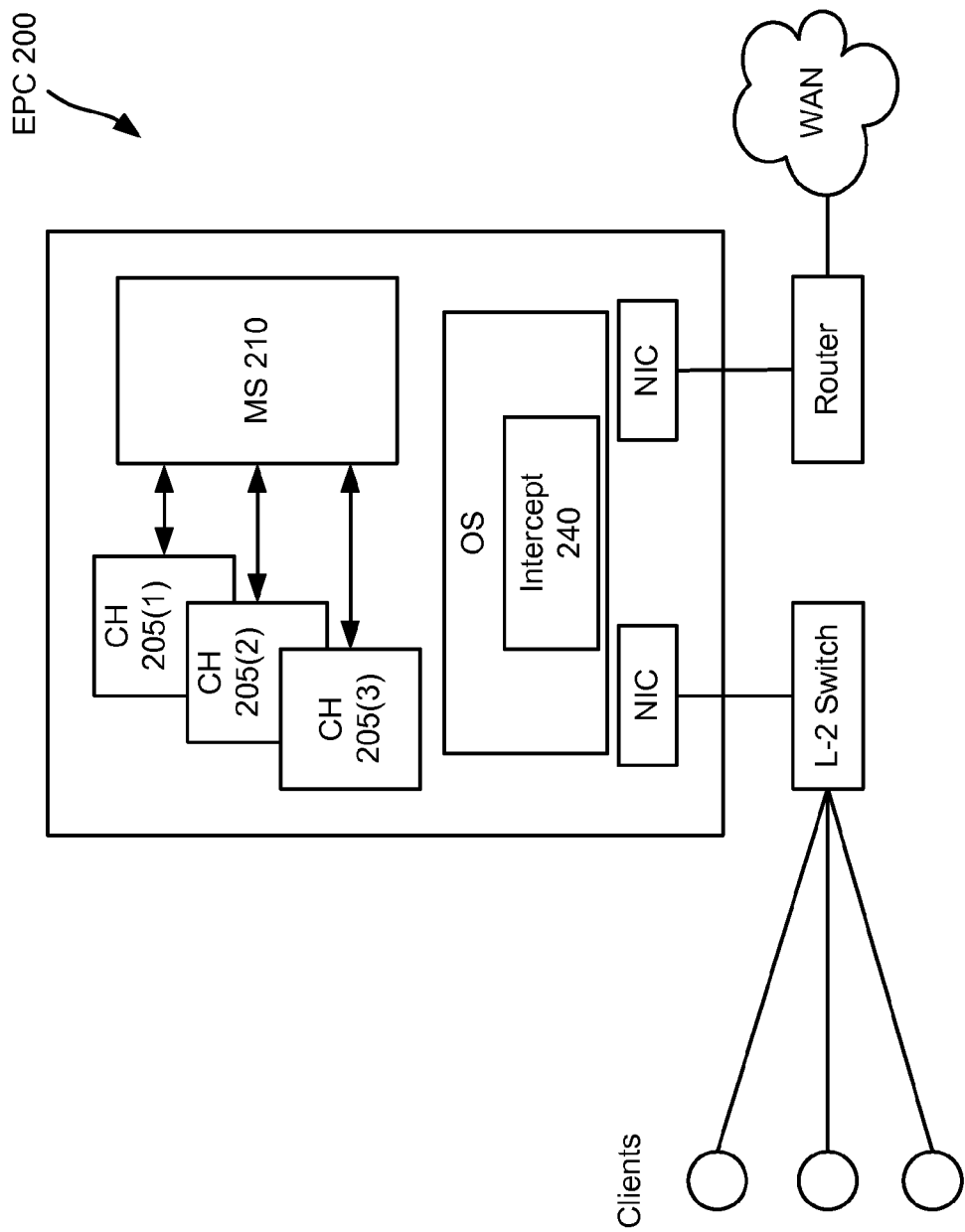
FIG. 2 is a block diagram of a proxy device according to the present invention, implemented as a dual-port NIC device.

An improved embodiment is illustrated in FIG. 2, where an EPC 200 includes a dual-port NIC and can be inserted in the network path between the layer-2 switch and the router, and further includes connection handlers 205 (or mechanisms to instantiate connection handlers 205 as needed) and a message store 210. This arrangement allows the EPC to transparently intercept and proxy connections, such as according to the methods described in McCanne IV. In this embodiment, the EPC 200 acts as a layer-2 relay or bridge for all traffic that it does not proxy. For connections that it does proxy, EPC 200 intercepts the corresponding traffic in an intercept module 240 and directs intercepted traffic to an appropriate connection handler 205 within EPC 200.

In this embodiment, client connections to the e-mail servers are terminated by EPC 200, much like a Web cache terminates connections. A connection handler is preferably created for each client session and a corresponding connection is established with the e-mail server targeted by the client.

When an e-mail client retrieves a message from the server, EPC 200 inspects its message store 210 to see if the message is already present and, if so, returns it. Otherwise, EPC 200 fetches the message from the origin mail server, stores the message in message store 210, and transmits the message to the e-mail client.

Replicating e-mail in this fashion is a straightforward task as e-mail protocols typically assign a unique identifier to every e-mail message and messages are not alterable. Thus, there is no consistency problem to solve since a copy of an e-mail message is effectively the same as the original message. In other words, if the EPC can locate a message in its message store using the unique identifier of that message, then it knows that copy of the message is always valid.

Figure 3:
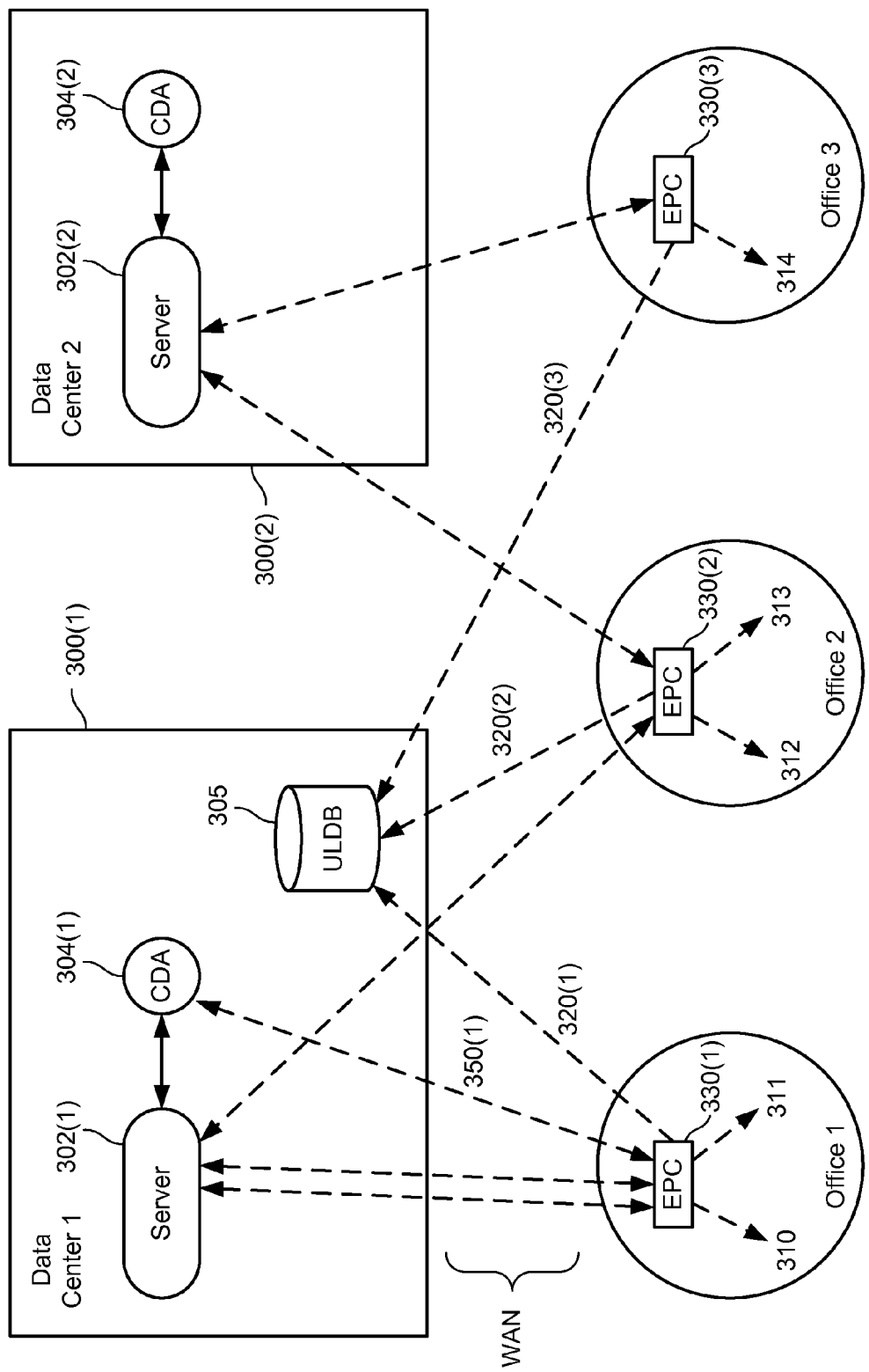
FIG. 3 is a diagram illustrating an arrangement of content delivery agents (CDAs), user location databases (ULDBs) usable for delivery of data in advance of requests for that data to locations network near to users likely to be requesting that data.

FIG. 3 illustrates a content delivery system further comprising content delivery agents (CDAs) deployed at or near the servers. A content delivery agent for an e-mail server pre-loads an e-mail proxy cache (EPC) with messages for users that are determined to be near that EPC. When new mail messages arrive at a server, the content delivery agent for that server inspects the message to determine the recipient(s) of the message. The content delivery agent then determines which EPC is nearest the recipient(s). This user location determination could be made in a number of ways, as described below. Once the appropriate EPC has been determined, the content delivery agent forwards a copy of the message to the selected EPC for storage in that EPC's message store. When the user then fetches the message, the EPC serves the message from its message store and the resulting performance is high.

One method for user location determination involves consulting a database maintained by a system operator. Alternatively, the determination could be made by consulting a database that is automatically built from dynamic observations of where users read their e-mail.

In one particular example, FIG. 3 illustrates two data centers 300(1) and 300(2) operating e-mail servers 302(1) and 302(2) respectively. As shown, each data center 300 also includes a CDA 304. Data center 300(1) is also shown including a user location database (ULDB) 305. It should be understood that the number of the data centers, e-mail servers, content delivery agents, clients and EPCs need not be identical to that shown FIG. 3. For example, a single e-mail server might be used or more than two e-mail servers might be used.

Clients 310, 311, 312, 313, and 314 are accessing e-mail via over the WAN. Each client communicates with one of the two e-mail servers 302 through a connection proxied by that client's local EPC 330. Associated with each e-mail server is a content delivery agent (CDA) 304. The CDA may be software running on the same computer as the e-mail server and interfacing with said server through an API, or it may be a device running on a computer attached to a network coincident with the e-mail server and interfacing with the e-mail server through a network protocol or an API on top of a network protocol.

As messages are retrieved by clients at various locations through their nearby EPC, each EPC records the fact that a user is retrieving e-mail from that location and transmits a message to ULDB 305 indicating a mapping between that user and that location (e.g., the location of that EPC). For example, EPC 330(1) transmits this information over connection 320(1). The message might contain user identification (i.e., a login name, user ID, etc.) as well as a location identifier (e.g., the IP address of the EPC through which the user is retrieving messages, etc.). The messages to the ULDB can be batched together and sent to at a configurable maximum rate to allow the system to scale without degrading performance.

Using this information, over time the ULDB learns the locations of the various users. As a consequence, when a new message arrives for a particular user, the CDA of the receiving server can pre-load that message into the message store of the EPC near that user as determined by the dynamic location information. For example, when an e-mail arrives for user 310 at server 302(1), CDA 304(1) delivers a copy of that message to EPC 330(1) over connection 350(1). If the ULDB indicates that the user accesses e-mail different locations serviced by different EPCs, the CDA can send a copy to each of the EPCs likely to service that user.

Figure 4:
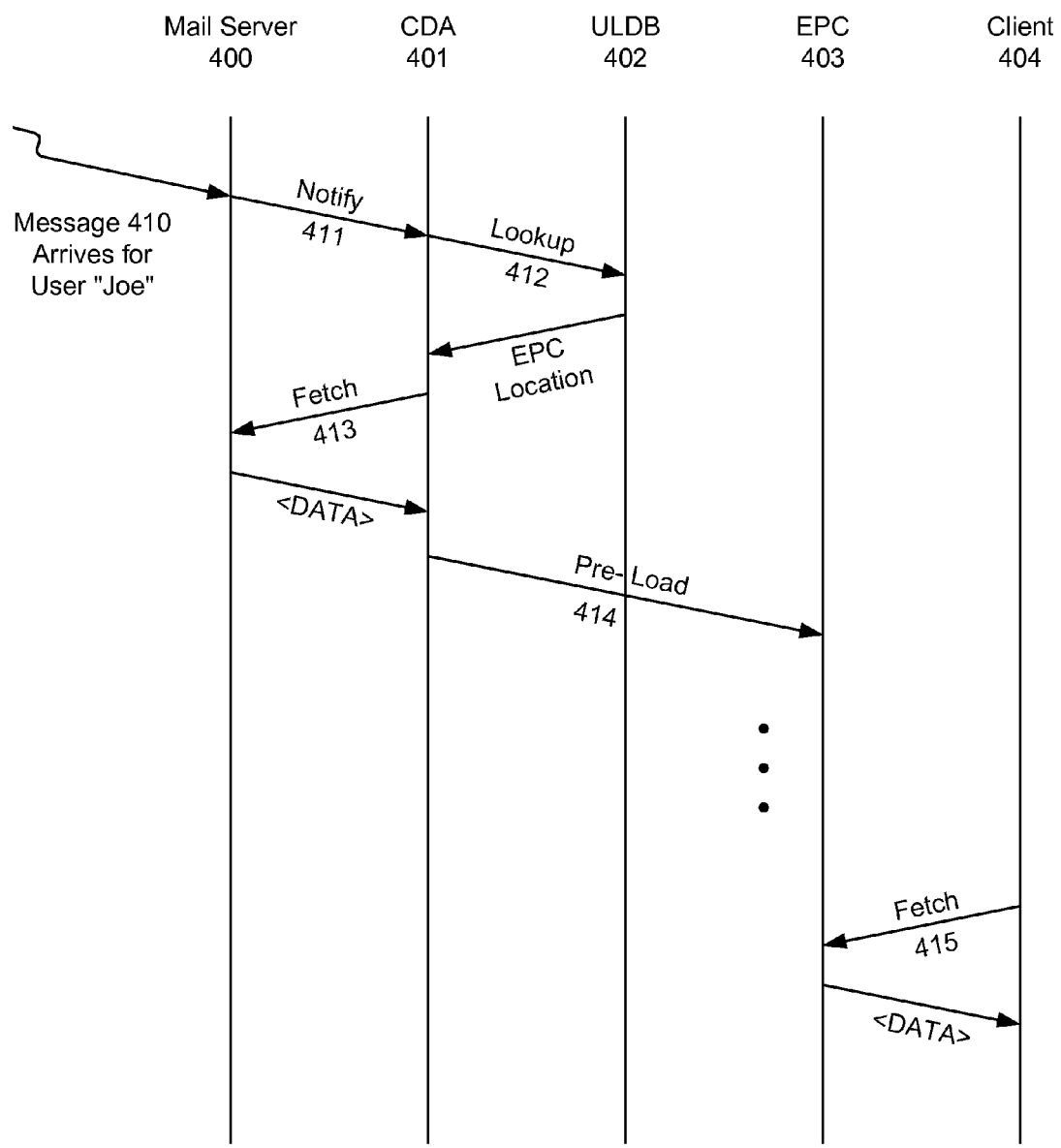
FIG. 4 is a swim diagram illustrating a process of e-mail delivery using an arrangement such as that shown in FIG. 3.

FIG. 4 shows a swim diagram of the delivery of an example message for a particular user. In this example, a message 410 arrives from the Internet at mail server 400. The mail server sends a "notify" message 411 to the CDA 401 indicating the arrival of the message for user "joe". CDA 401 in turn sends a lookup message 412 for user "joe" to ULDB 402, which responds with the location of device EPC 403. CDA 401 sends a "fetch" message 413 to mail server 400 to retrieve the message data (and any attachments) from message 410. Once the data is received, CDA 401 transmits the data in a "pre-load" message 414 sent to EPC 403. Later, when the user attempts to read the message through e-mail client 404, the client transmits a "fetch" message 415 to the server to requesting the contents of message 410. Subsequently, EPC 403 intercepts message 415 and serves the corresponding data from its local message store to the client, thereby achieving high delivery performance.

Using Connection End-Point Proxies to Deliver Data Based on User Affinities

The above approach improves over existing solutions, but does require deploying and administering a content delivery agent associated with each server, which can be difficult and expensive for enterprise IT organizations. Additionally, this approach may involve several interdependent components that require integration with a number of different protocols, application programming interfaces (APIs), intercommunicating agents, and so forth.

An alternate approach will now be described, wherein content is delivered based on user affinities using connection end-point proxies. As the term is used herein, a connection end-point proxy (CEP) is a proxy agent embedded in some device or otherwise attached to a network that sustains client-server sessions after the client has terminated its server connection so that the connection can be used for proxy-initiated content delivery.

When a client attempts to terminate a connection representing a client-server session, the CEP intercepts the attempt to terminate and maintains the session, thereby inheriting the client session. Because the CEP inherits the client session, it also inherits all the security and access capabilities of that session. The CEP thus can inject synthetic transactions into the client-server session that cause message data, attachments, and so forth to be retrieved from the server into a local proxy. Even if the client terminates its session, the CEP can retain the client connection, continue to monitor the client's message store, and retrieve messages and corresponding data as they arrive for that user from the server into the CEP. When a client opens a new session with the server in question, the CEP tears down the previously sustained session then allows the new session to be established. In a configuration where a server-side proxy exists in addition to a CEP running at a client-side proxy, an agent at the server-side can note when a second user session is established and tear down any CEP connections that had been sustained beyond the termination of the client connection.

CEPs can be interposed in the path of client-server connections by deploying within a network proxy device. A proxy device that houses a set of CEPs, one for each connection being proxied, is called a connection end-point proxy device (CEPD) herein.

Figure 5:
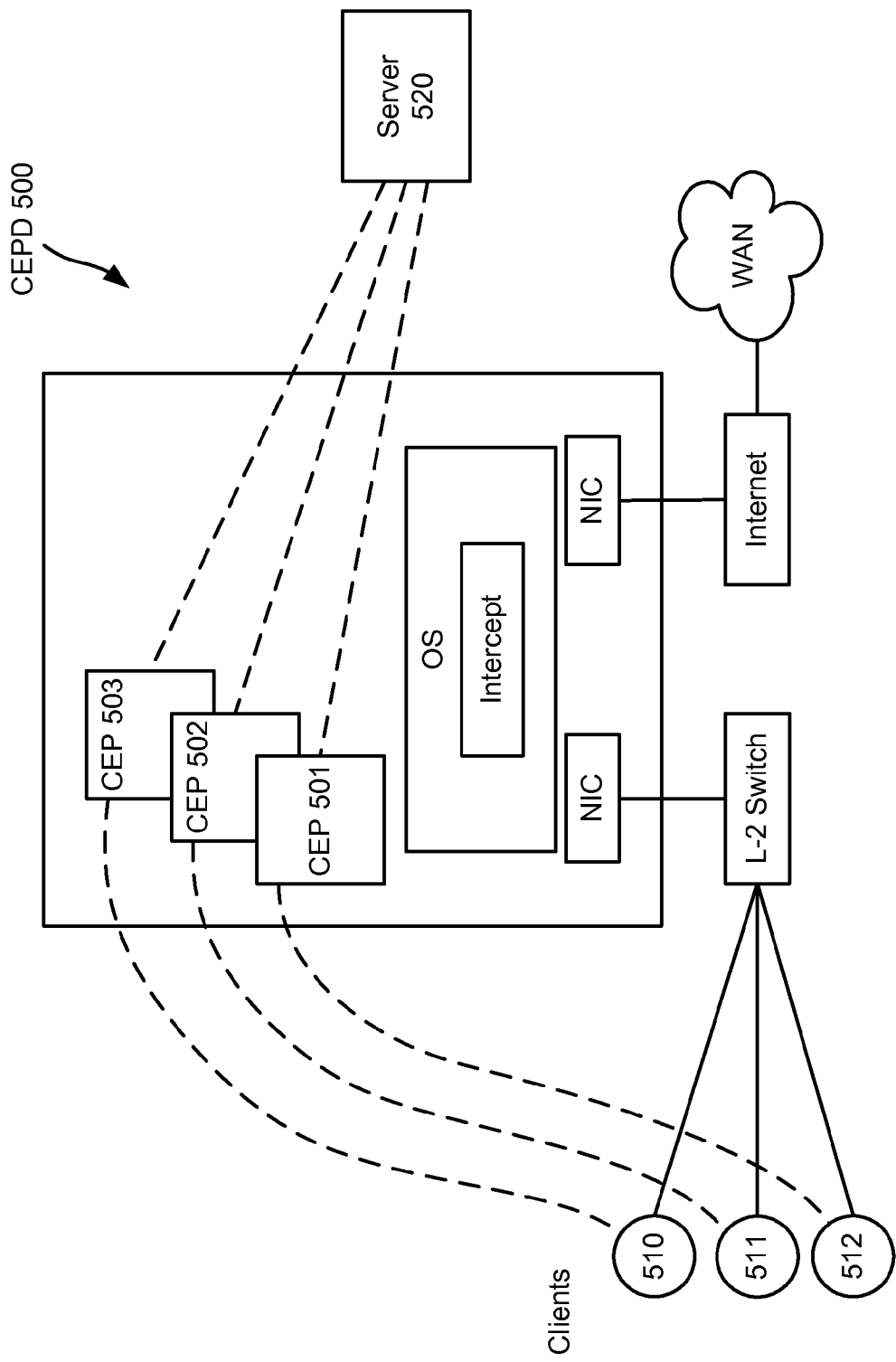
FIG. 5 is a diagram illustrating connections that a proxied through a connection end-point proxy (CEP).

FIG. 5 illustrates a CEPD, which attaches to a network through one or more network interfaces. In this case, the preferred configuration of two NICs is shown. A number of clients (510, 511, 512) have connections to server 520 that are proxied through CEPs 503, 502, and 501 respectively.

Figure 6:
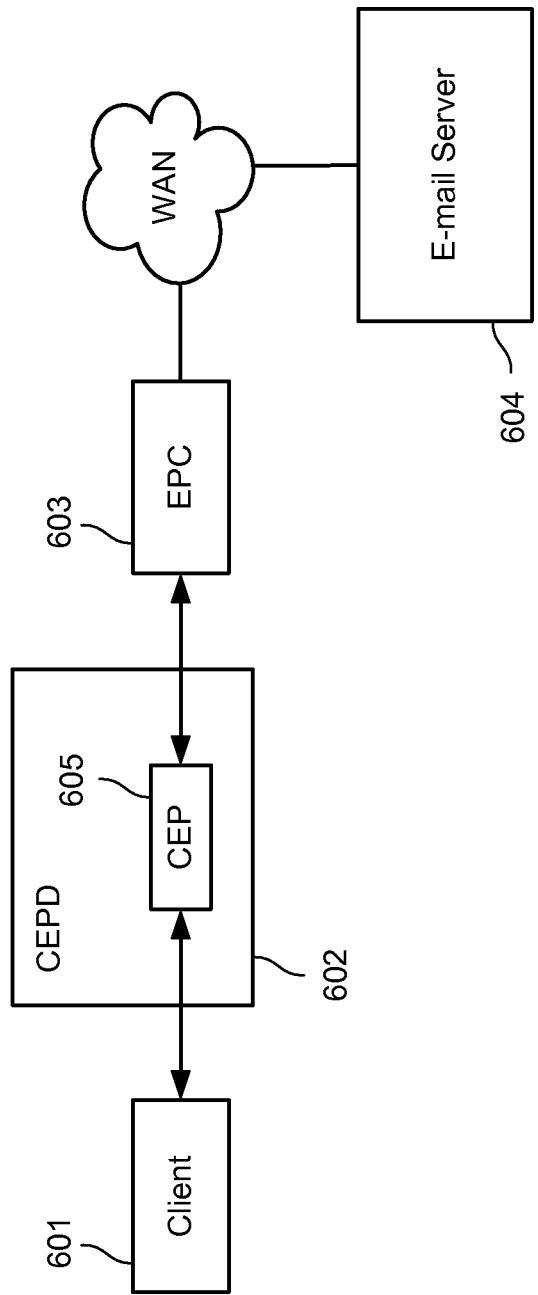
FIG. 6 illustrates one embodiment of a content delivery system wherein a connection end-point proxy device (CEPD) integrates with an e-mail proxy cache (EPC).

FIG. 6 illustrates one embodiment of a content delivery system wherein a connection end-point proxy device (CEPD) integrates with an e-mail proxy cache (EPC). As shown there, client 601 initiates one or more transport connections to server 604 to retrieve, process, examine, etc., e-mail messages or messages of other types such as calendar data, newsgroups, shared files, etc.

In some cases, the protocol that client 601 uses to access the e-mail server may be a standardized protocol such as IMAP or a proprietary protocol such as MAPI. IMAP is described in M. Crispin, "Internet Message Access Protocol—Version 4rev1", Request-for-Comments (RFC) 2060, December 1996. MAPI is Microsoft's proprietary protocol Messaging API (MAPI), which runs over Microsoft's Remote Procedure Call (RPC) protocol. In such an embodiment, the client's IMAP or MAPI connection(s) would be transparently intercepted by CEPD 602, which terminates the IMAP/MAPI connection(s) at CEP 605, and initiates a corresponding transport connection (or set of connections) with the origin e-mail server 604. The e-mail proxy 603 in turn intercepts the connection(s) initiated from the CEPD 602, and subsequently initiates a corresponding transport connection (or set of connections) with the origin e-mail server 604.

Once this pipeline of transport connections is established, messages from the client are relayed over the various connections comprising the pipeline to the server, while responses from the server are relayed back to the client. At the start of the connection, the client might be authenticated through various mechanisms that exchange messages back and forth. Once the client has been authenticated, the CEP 605 is free to perform content delivery by injecting synthetic messages into the client-server session. For example, e-mail clients typically fetch all of the headers for display to the user. Then, only after the user attempts to display and read a message does the client fetch the message. Moreover, e-mail messages often contain large attachments that are likewise only fetched when the user attempts to open or download the attachment. To improve the user experience, a CEP can proactively scan the contents of a user's mailbox and fetch message and attachment data before they are requested by the user. Alternatively, the CEP can watch as headers are retrieved and inject synthetic messages to requesting the corresponding message text and attachment data.

Figure 7:
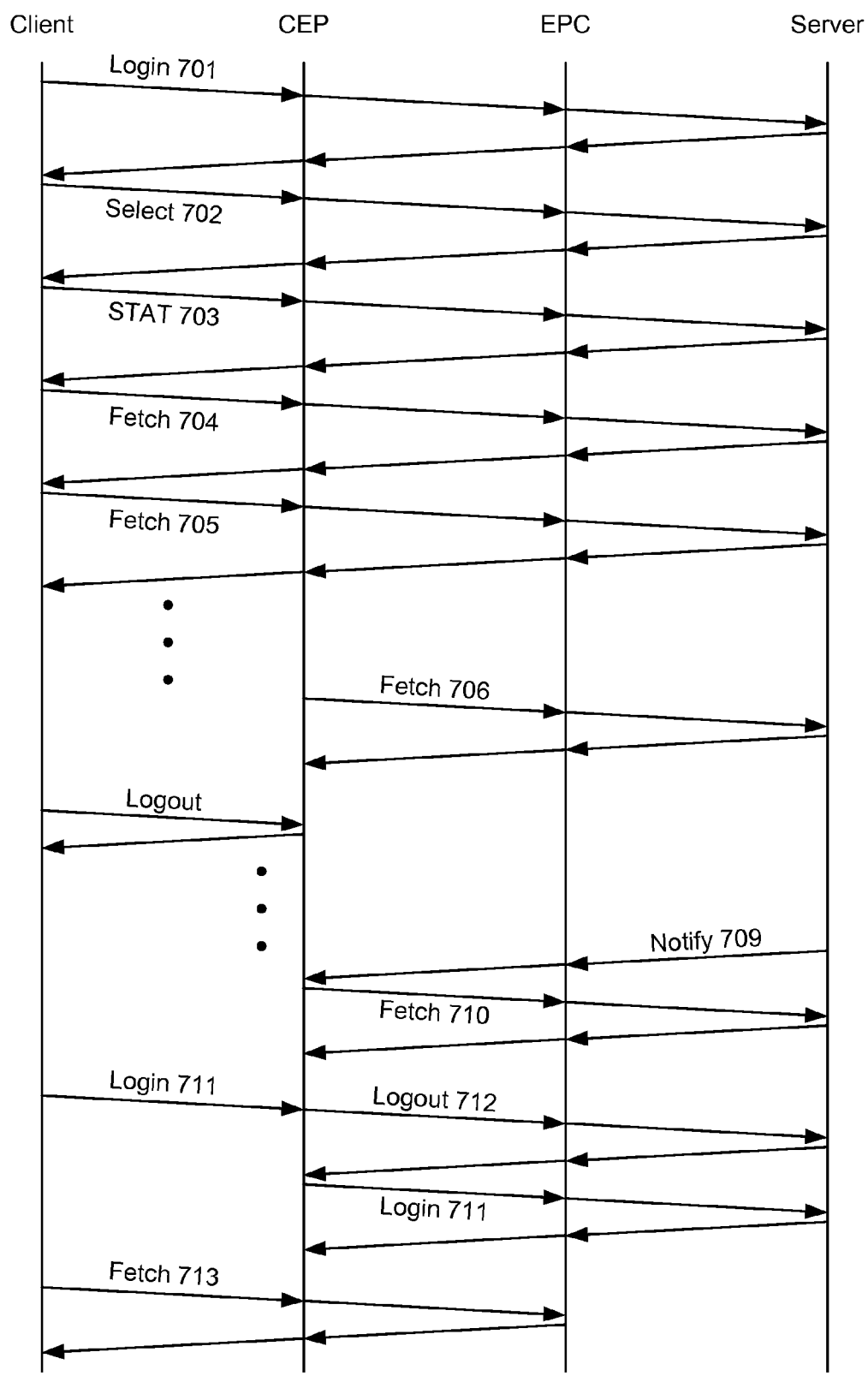
FIG. 7 is a swim diagram illustrating one example of how a content delivery function might be performed on top of normal e-mail messaging protocols.

FIG. 7 is a swim diagram illustrating one example of how the content delivery function might be performed on top of normal e-mail messaging protocols. In this example, the IMAP protocol is assumed.

In the illustrated example, the client first establishes its session with the e-mail server with "login" request 701, including appropriate authentication information in the login message. Once the client has authenticated itself, it then issues "select" request 702 to specify that subsequent operations are to be performed against a particular mailbox, for instance, the user's "inbox". Next, the client issues "stat" request 703 to learn various information including whether new messages are present. The client then issues subsequent "fetch" commands (704 and 705) to retrieve message data in response to the user reading and display messages. Then, in this example, the user goes idle and does not read any subsequent messages, even though they exist in the mailbox. At this time, the CEP detects that the session is idle and transmits a synthetic "fetch" request 706 for other messages that are in the user's Inbox but have not been retrieved. This causes the e-mail proxy cache to store the messages in its mail store. Later, when the user reads these messages by sending "fetch" requests, the messages are transmitted with high performance across the LAN from the e-mail proxy cache to the client.

Later, the user quits the e-mail client, which causes the client connection to terminate. However, instead of tearing down the connection through the e-mail proxy cache to the server, the CEP sustains the connection and continues to monitor the data source for that user within the e-mail server. For example, when new e-mail messages arrive for that user, the server transmits a "notify" message 709 toward the client, which is intercepted and consumed by the CEP. In response, the CEP retrieves the data corresponding to the message body and attachments of the newly arrived e-mail by sending "fetch" request 710. Thus, the e-mail proxy cache is continually filled with data that represents the e-mail content of the user's session without the need to explicitly build a database that maps users to locations.

Now suppose the user restarts the e-mail client, opens a connection to the e-mail server and transmits a new "login" request 711 to establish the session. At this point, the CEP takes note that the user is establishing a new session, so it tears down the old session by sending a "logout" request 712 to the server on the old connection, closes that connection, then allows the client's "login" request to continue on toward the server on the new connection. The client then attempts to retrieve messages that had previously been retrieved by the CEP into the e-mail proxy cache via "fetch" request 713. As such, they are delivered with high performance as they are served from the e-mail proxy cache across the LAN.

Figure 8:
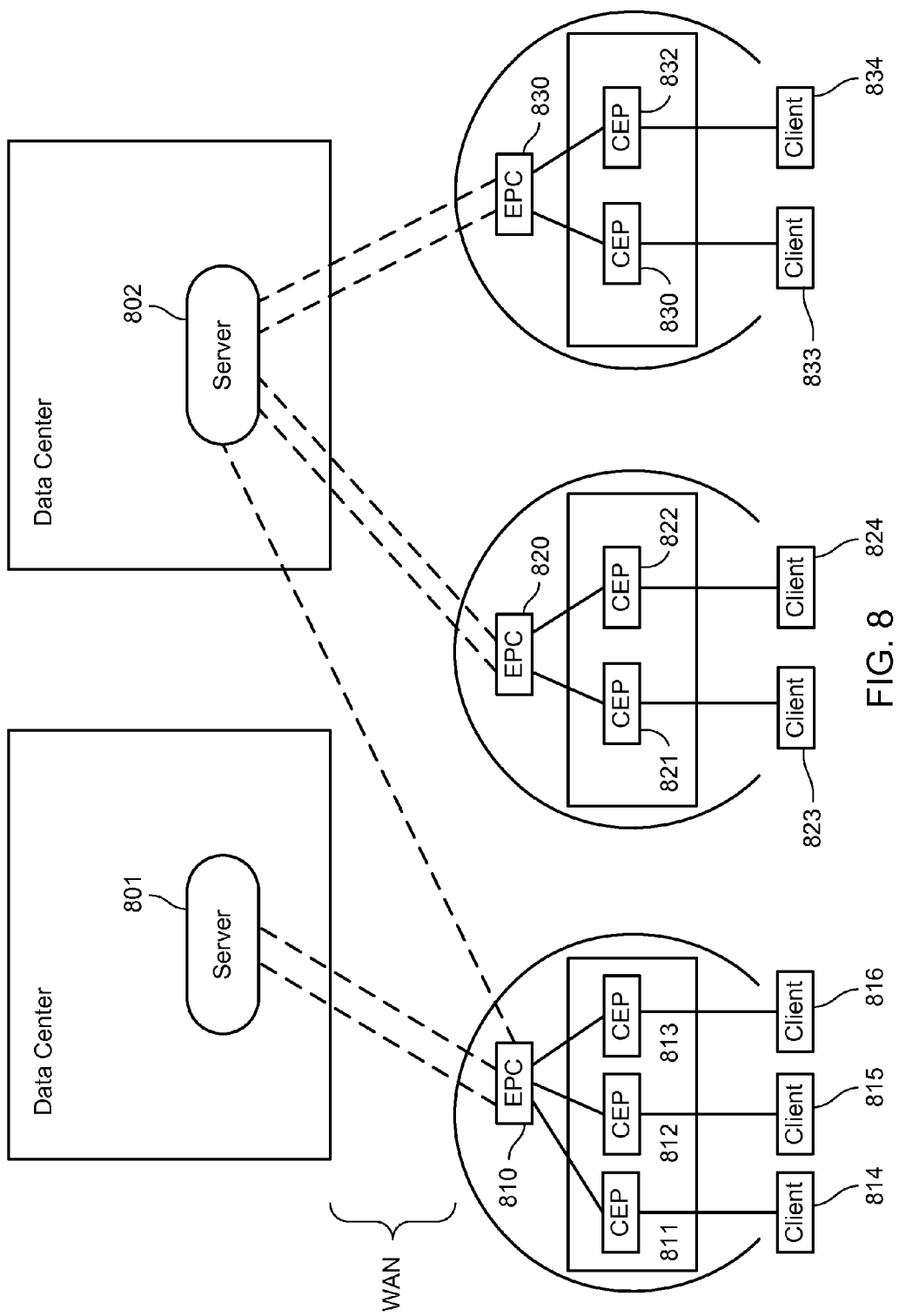
FIG. 8 is a diagram illustrating an arrangement of connection end-point proxies (CEPs) and e-mail proxy caches (EPCs) in a distributed enterprise.

FIG. 8 illustrates how some of the above the teachings can be generalized and deployed across a distributed enterprise with multiple locations. In the illustrated example, there are two servers, server 801 and server 802, in two data centers. In one office, are three clients 813, 813, 814, a CEP for each client (811,812,813) and an EPC 810. Likewise, there are other clients, CEPs, and EPCs at other offices. Each client retrieves its messages from one of the two servers. As clients come and go, a CEP remains to represent the user's e-mail client. Thus, as new messages arrive, the CEP continually copies them down to the local site along the persistent connection to the corresponding e-mail server. For example, since client 814 retrieves its messages from server 802, CEP 811 will automatically fetch all messages from server 802 and pre-load them into EPC 810 even when the connection from client 814 is not present.

In effect, the ensemble of persistent connections terminated at EPCs forms a user-centric content delivery network from servers to user locations that delivers content over the native client-server connections. Thus, user location is implied by the connection fabric and need not be collected and explicitly stored in some sort of database.

Figure 9:
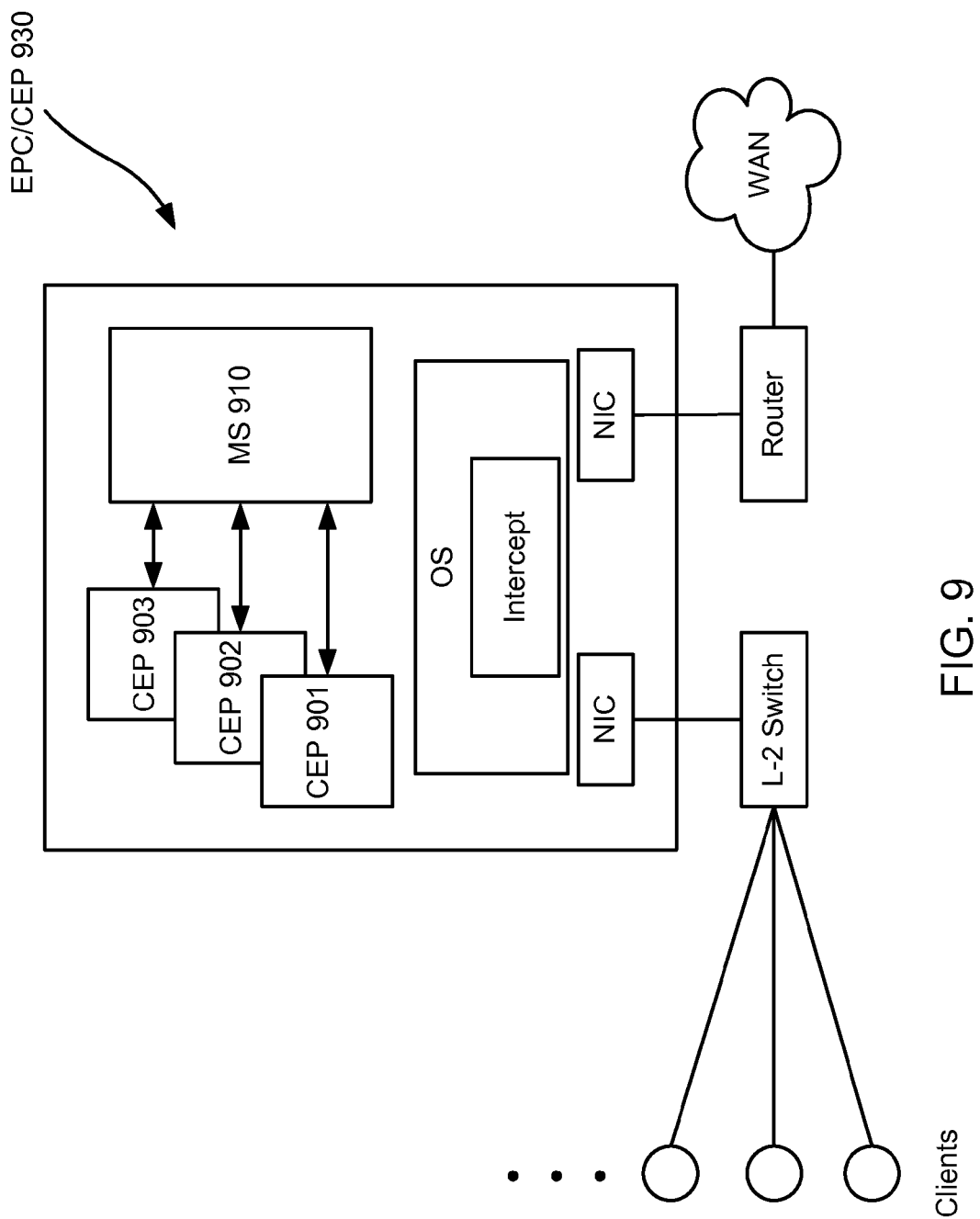
FIG. 9 illustrates one embodiment of an integrated EPC and CEP device including a dual-port NIC device.

In another embodiment of the present invention, the EPC and CEP functions are integrated into one process and there is no need for a CEPD to contain the CEP entities. In such embodiments, the CEP implements the proxy end-points and interacts with the message store directly. When a client terminates its session, the CEP sustains the server session as described above. FIG. 9 illustrates one example of this. As shown, the CEP integrates its functionality into the EPC and directly terminates the client and server transport connections.

In another embodiment, CEPs can be configured into a transaction accelerator and segmentation system as described in McCanne III, McCanne I, optionally using hierarchical segmentation as described in McCanne II, and transport connection interception and auto-configuration as described in McCanne IV. Moreover, CEPs can be used to effect content delivery for any user-affinity-based protocol, not just e-mail. This is facilitated by the fact that the segmentation and transaction acceleration scheme described in McCanne I is protocol and application independent. That is, unlike the EPC described above, transaction acceleration using segmentation works for many different protocols and applications, not just e-mail.

Figure 10:
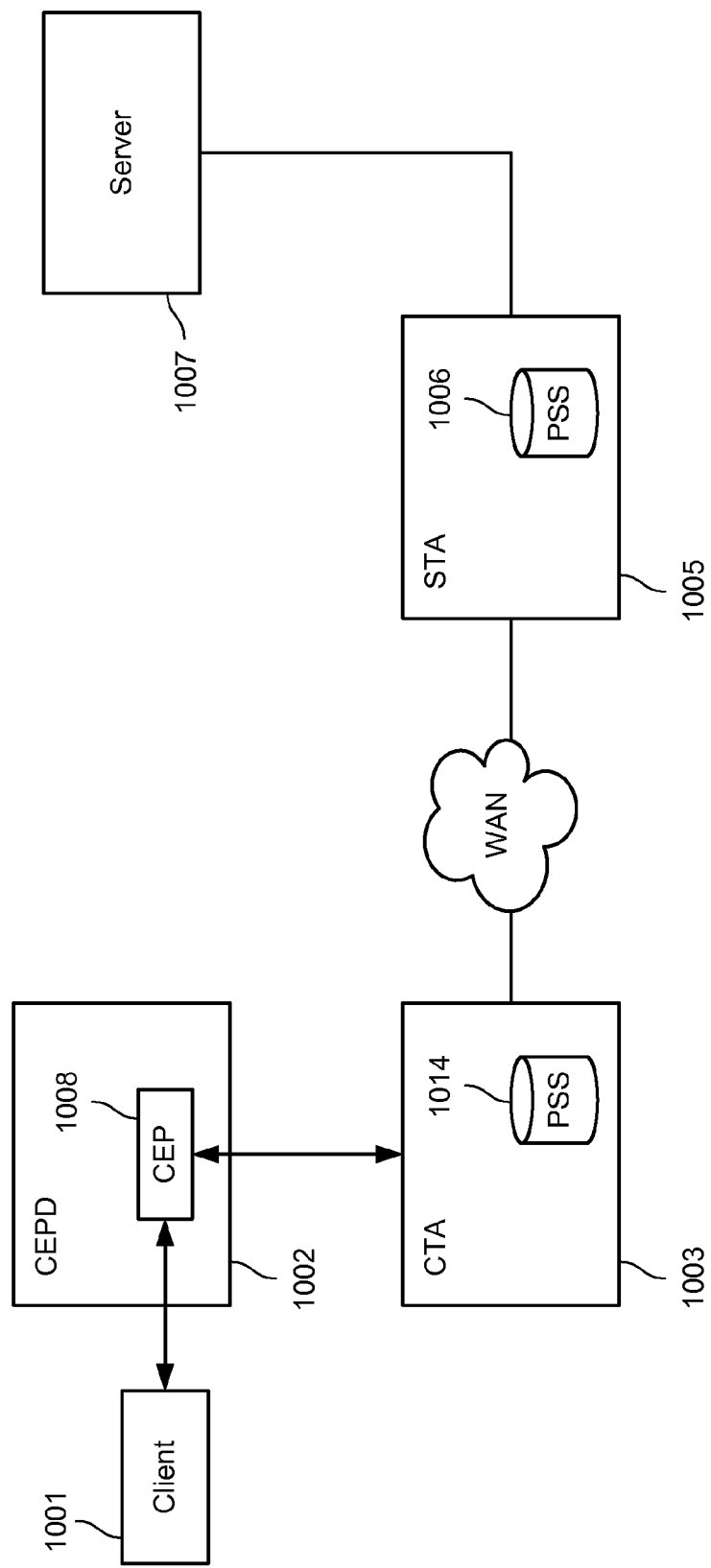
FIG. 10 illustrates one embodiment of an integrated CEPD and client-side transaction accelerator (CTA).

FIG. 10 illustrates this. A client-side transaction accelerator (CTA) 1003 with a persistent segment store (PSS) 1004 is situated near the clients while a server-side transaction accelerator (STA) 1005 with a PSS 1006 is situated near a server. Interposed between CTA 1003 and STA 1005 is a WAN. In addition, a CEPD 1002 is interposed between clients and CTA 1003. A CEP 1008 terminates the transport connection from client 1001 to server 1007 and attempts to open a new connection from CEPD 1002 to server 1007. When CEP 1008 initiates a connection to server 1007, the CTA and STA intercept the connection in some manner such as, for example, as described in McCanne IV.

Given this configuration, CEP 1008 is in a position to effect content delivery of desired data by injecting synthetic protocol messages into the client-server session that cause the server to transmit the desired data toward the client. CEP 1008 in turn discards the resultant data knowing that the segments comprising the data are now all present in PSS 1004 and PSS 1006. When client 1001 later attempts to retrieve the corresponding data from server 1007, that data need not be resent over the network as the CTA/STA pair work together to collapse the requested data, such as is described in McCanne I.

Unlike e-mail, where messages are delivered to specific users, other protocols involve data access patterns incurred by users in an ad hoc fashion. For example, in a file access protocol such as CIFS, a user can access a multitude of different files, created by different users, and stored on different servers. Likewise, a user browsing the Web (either a private enterprise Web or the Internet in general) can end up accessing data from almost anywhere in the world. To deal with this, user affinities for data objects such as Web pages or files can be inferred by the CEP.

One approach to inference is to use the transaction prediction framework described in McCanne III. Another approach is to collect user affinity information in a database and use this database to drive the CEP content delivery algorithm.

In one embodiment, each CEP in a device maintains a user-affinity database (UADB). The UADB contains a set of records that record accesses to data objects. Each record includes a user identifier (e.g., a login name), an object identifier (e.g., a file server and path name, or a Web URL), a timestamp of first access, a timestamp of most recent access, a count and possibly other fields. The record may contain other protocol- or application-specific information that may be used in different ways by different content delivery policies and/or algorithms. For example, the record format for file access protocols might also include the "last modified time" of the object in question.

Each time a data object is accessed by the client through the CEP, the CEP looks up the object record in the UADB. If the object record does not exist, a new record is created for that user and object and entered into the UADB with the timestamps set to the current time and the count initialized to 1. If the record already exists, the count is incremented and the last access time is updated.

Given the UADB, the CEP performs content delivery as a background process, e.g., at night, during times of idle network activity, continually at some configured bit-rate, etc. This can either be done over a session maintained by the CEP after the client terminated the connection or the CEP can login in (establish the connection) if the CEP has clearance to initiate its own connections.

This background delivery process is implemented by having the CEP scan the UADB for all records matching the user being handled by said CEP in a round-robin fashion. For each record, the object is retrieved from the server and simply discarded by the CEP, thus populating the PSS in the local CTA with all of the segment data that represents the desired object. This step can be optimized by additionally keeping a modification timestamp for the object in question (as described above) and only fetching the data object if the modification time on the server is more recent than the last modification time stored in the object record. This scheme is particularly efficient because similar data that happens to be pulled multiple times (e.g., two files with the same data) traverse the WAN only once due to efficient properties the segmentation algorithms described in McCanne I and McCanne II.

Various policies can be used to control how often data objects are scanned and, if necessary, pulled across the network. For example, more frequently accessed objects can be scanned more often than less frequently accessed objects. Or, more recently accessed objects can be scanned more often than less recently accessed objects. Or, objects not accessed for some configurable amount of time can simply be discarded from the UADB.

Figure 11:
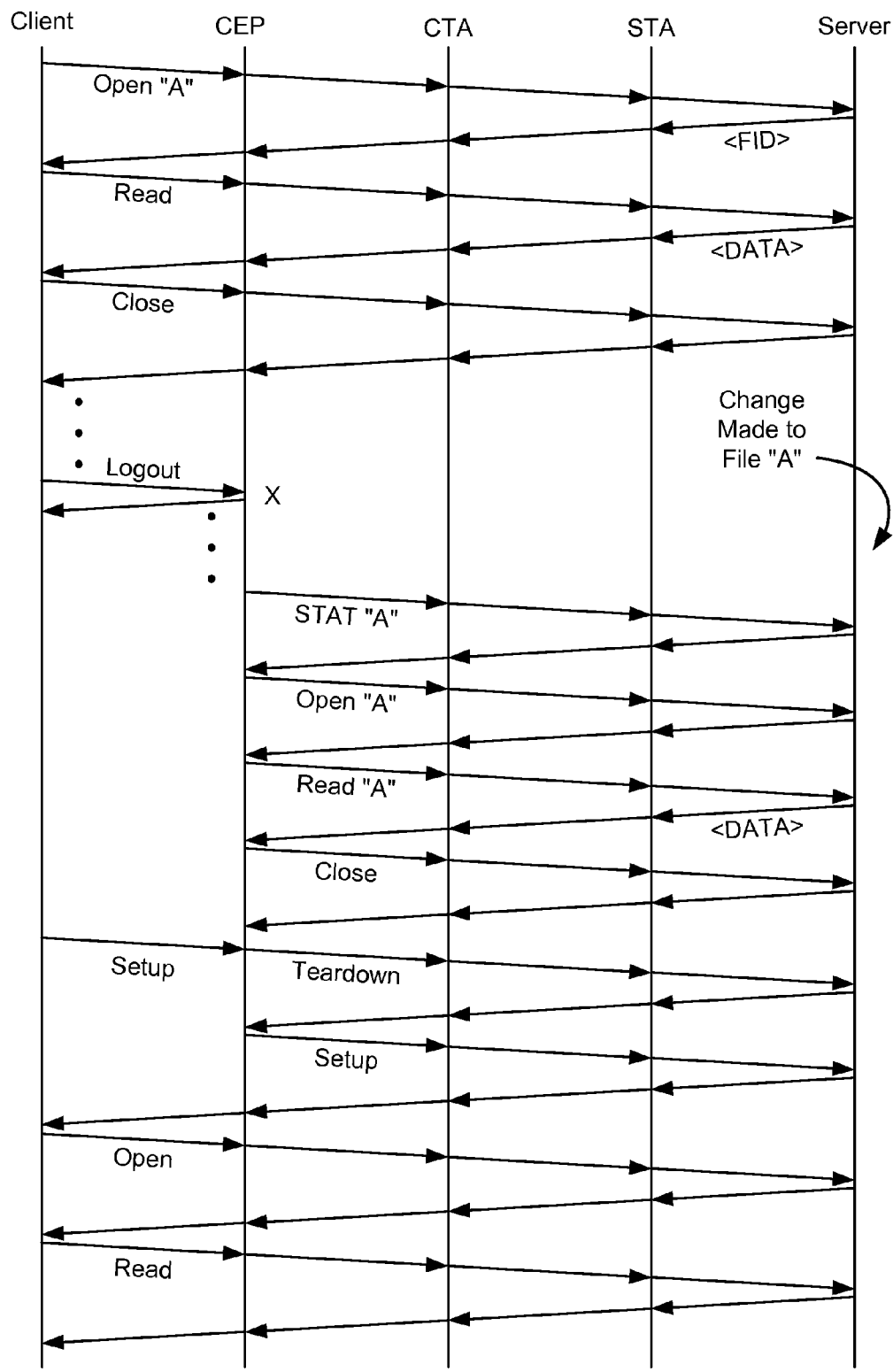
FIG. 11 is a swim diagram of a client-server interaction with an interposing CEP, with a file access protocol such as CIFS.

FIG. 11 illustrates a swim diagram of a client-server interaction with an interposing CEP, assuming a file access protocol like CIFS. In this example, the CEP includes a UADB (not shown) that records the file access patterns. It is assumed that the client has already established a CIFS session with the CIFS server.

At the top of the diagram, the client opens a file "A", then reads data from file "A", and closes it. As these client-server transactions flow through the CEP, the CEP records an object record in the UADB noting that the user has accessed file "A". Some time later, the client logs out and the session is terminated, though as mentioned above, the CEP maintains the session with the server on behalf of the disconnected client to effect content delivery. Some additional time later, a change is made to the file "A", e.g., by some other user who has write permissions for that file. All the time the background content delivery process is running within the CEP occasionally checking the modification time of file "A" as shown in the diagram by sending a "stat" message to the server for file "A". At some point, the CEP notes that the modification time for file "A" is more recent than the modification time stored in the UADB object record. As a consequence, the CEP opens file "A", reads its contents, and simply discards the resulting since all the segments that represent the data contained in file "A" have now successfully been replicated into the PSS in the local CTA. In turn, the client establishes a new CIFS session with the server and access file "A". The CTA then tears down the old CIFS session and allows the new CIFS session to be established.

Alternatively, an agent in the STA could perform the work that tears down the old session and allows the new session through. The advantage of this server-side approach is that users accessing the e-mail service from multiple locations over time will not leave behind a trail of active content-delivery sessions even though there is only one client active at a time. As all the necessary segments are present in the CTA, high performance is thus attained for retrieving file "A" across the WAN.

Some advantages of using CEPs in combination with transaction accelerators and segmentation compared are apparent in the example of an e-mail being sent to a large number of recipients. In that case, suppose a certain message is sent to many recipients. Then, even though each of the many instances of a CEP pulls down a separate copy of the e-mail data, that data is transmitted across the WAN just once to each location by the CTA/STA pair. Even each CEP acts independently of one another and does not do anything to coordinate the efficient delivery of data, only one copy of the e-mail is transmitted to any given location. Moreover, the approach integrates easily with existing infrastructure, requiring no changes or additions to existing clients, servers, or applications.

Figure 12:
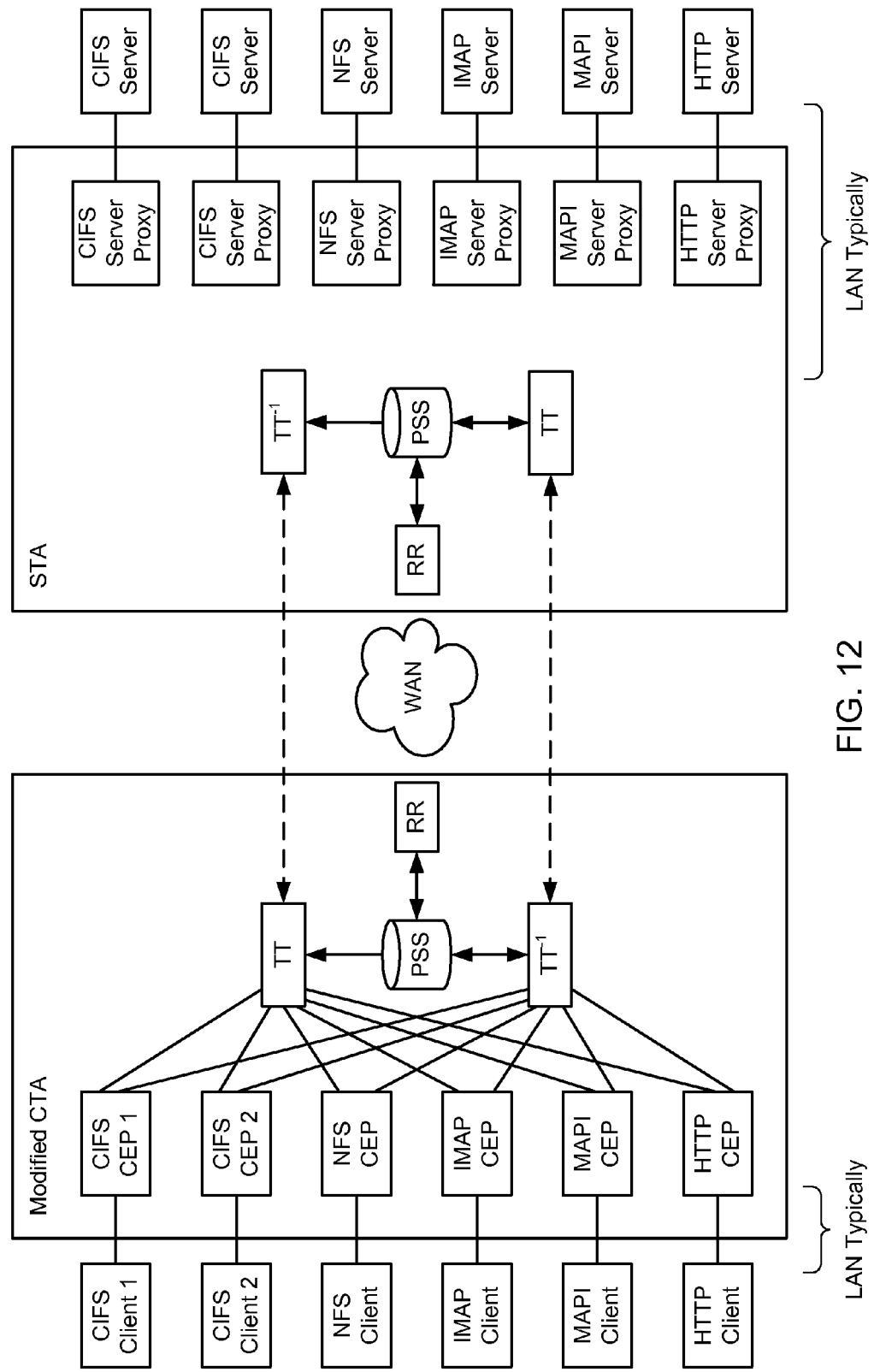
FIG. 12 is an illustration of portions of a content delivery system including protocol-specific and/or protocol-aware CEPs.

As is evident in the discussion of CEP content delivery for CIFS and e-mail, protocol-specific knowledge within the CEP is typically required to interpret and inject synthetic messages into the client-server session to desired data transfers. In some embodiments, protocol-specific knowledge is embedded in multiple types of CEPs that are co-resident within a CTA to create a "modified CTA". This configuration is illustrated in FIG. 12, which shows a number of clients communicating through the modified CTA. Each client communicates with an instance of protocol-specific CEP and there may be more than once instance of each such CEP.

For example, a CIFS client communicates with e a CIFS CEP and a MAP client communicates with a MAPI CEP. As described in McCanne I, each of these CEPs can act as a client proxy that in turn communicates with the transaction transformation modules (TT and $TT^{-1}$) that leverage the PSS to reduce bandwidth consumption over the WAN. Each CEP logically communicates with a server side proxy on the STA, which in turn communicates with the origin server thereby connecting the client to the target server. For example, the CIFS CEP communicates with a CIFS server proxy, which in turn, communicates with the target CIFS server.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a network supporting transactions between clients and servers, wherein a client is a host that requests a transaction and a server is a host that issues responses responsive to client requests and wherein packets between a client and a server travel over a network path comprising one or more hops and having one or more operating characteristic to overcome, a method of transporting data to overcome the one or more operating characteristic comprising:
    identifying user affinity for a data object, wherein said user affinity of the data object indicates which user or users might be associated with the data object such that a user having said user affinity to the data object is more likely to request the data object than a user not having said user affinity to the data object, wherein a user affinity of a given data object is a function of at least a portion of the data of the given data object;
    dynamically identifying user locations, wherein a user location represents an association between a user and preload node, wherein a preload node is a network location wherein preloaded data can be stored to overcome at least one of the one or more operating characteristics;
    storing an association between a particular user and a particular preload node identified as a particular user location for the particular user, wherein the association is stored at least when the particular user is not currently using the particular preload node;
    transporting particular data having a specified user affinity with the particular user when a particular client associated with the particular user is disconnected from the network, in advance of a client request from the particular client on behalf of the particular user having the specified user affinity for the particular data, from a server to the particular preload node,
    wherein identifying said user affinity of the data object is performed at or near the server using the data object, wherein the data object is not received from the client or the particular user;
    wherein identifying the user affinity for the data object is performed at a data center, wherein the user affinity is based on an intended recipient of the data object, and wherein identifying the user affinity for the data object includes inspecting, with a content delivery agent of the data center, the data object to determine the intended recipient, and
    wherein the particular data having the specified user affinity is transported in advance of any client request to the data center for the particular data and is transported from a server of the data center to the preload node.

2. The method of claim 1, wherein the one or more operating characteristics are selected from bandwidth usage, error rate and latency.

3. The method of claim 1, wherein the data object comprises one or more of an e-mail, a dataset, a file, or a portion of a database.

4. The method of claim 1, wherein the user affinity of the data object is to a single user.

5. The method of claim 1, wherein the user affinity of the data object is to a plurality of users.

6. The method of claim 1, wherein identifying user affinity comprises:
    determining which users access which data objects; and
    assigning user affinity to those data objects according to which users access those data objects.

7. The method of claim 1, wherein dynamically identifying user locations comprises:
    determining which users access the network using particular clients;
    determining a set of preload nodes associated with those particular clients; and
    populating a user location database with records associating those users with the set of preload nodes.

8. The method of claim 1, wherein the particular preload node is a proxy.

9. The method of claim 1, wherein the particular preload node includes a data cache.

10. The method of claim 1, wherein the particular preload node includes a proxy and a segment store.

11. The method of claim 1, wherein the client-server session is an authenticated session.

12. The method of claim 1, wherein the data center includes the user location database.

13. The method of claim 1, wherein the dynamic user location is determined from previous interactions of the particular user with the data center.

14. In a network supporting clients, servers and proxies, wherein a client is a host that transmits requests to a server, the server is a host that issues responses responsive to client requests, and a proxy is a host that acts as a protocol intermediary between one or more clients and one or more servers, and wherein packets between the client and the server travel over a network path comprising one or more hops and having one or more operating characteristic to overcome, a method of transporting data to overcome the one or more operating characteristic, the method comprising:

- determining a preferred proxy for one or more users by detecting a proxy used by the one or more users;
- storing an association between the one or more users and the preferred proxy, wherein the association is stored at least when the one or more users are not currently using the preferred proxy;
- detecting either a newly available data object stored on a server or a modification to an existing data object stored on a server;
- identifying user affinity for the detected data object, wherein said user affinity of the data object indicates which user or users might be associated with the data object such that a user having said user affinity to the data object is more likely to request the data object than a user not having said user affinity to the data object, wherein a user affinity of a given data object is a function of at least a portion of the data of the given data object;
- identifying a preferred proxy for a particular user having said user affinity, wherein the preferred proxy is determined from the stored association; and
- transporting the detected data object when a particular client associated with the particular user is disconnected from the network, in advance of a client request from the particular client on behalf of the particular user, from a server to the preferred proxy, wherein said transporting includes inheriting, at a connection end-point proxy, security and access capabilities of a client-server session between the client and the server by intercepting the client-server session;
- wherein identifying the user affinity for the data object is performed at a data center, wherein the user affinity is based on an intended recipient of the data object, and wherein identifying the user affinity for the data object includes inspecting, with a content delivery agent of the data center, the data object to determine the intended recipient, and
- wherein the particular data having the specified user affinity is transported in advance of any client request to the data center for the particular data and is transported from a server of the data center to the preferred proxy.

15. The method of claim 14, wherein the data object comprises one or more of an e-mail, a dataset, a file, or a portion of a database.

16. The method of claim 14, wherein identifying user affinity comprises:

- determining which users access which data objects; and
- assigning user affinity to those data objects according to which users access those data objects.

17. The method of claim 14, wherein the transporting is performed when the one or more users are not currently using the preferred proxy.

18. The method of claim 14, wherein the client-server session is an authenticated session.

* * * * *